United States Patent [19]
Griffin

[11] Patent Number: 5,452,932
[45] Date of Patent: Sep. 26, 1995

[54] FREEZE HOLDING DEVICE AND PROCESS

[76] Inventor: David Griffin, 100 S. Broadway, Irvington, N.Y. 10533

[21] Appl. No.: 153,378
[22] Filed: Nov. 16, 1993
[51] Int. Cl.⁶ .................................................. B25J 15/00
[52] U.S. Cl. ............................ 294/1.1; 294/86.4; 901/30
[58] Field of Search .................................. 294/1.1, 86.1, 294/86.4, 902; 901/30, 31, 50

[56] References Cited

U.S. PATENT DOCUMENTS

| | | | |
|---|---|---|---|
| 3,140,890 | 7/1964 | Schwartz | 294/1.1 |
| 3,611,744 | 10/1971 | Sutz | 294/1.1 X |
| 4,988,352 | 1/1991 | Poley | 606/107 |

FOREIGN PATENT DOCUMENTS

| | | | |
|---|---|---|---|
| 193732 | 8/1987 | Japan | 294/86.4 |
| 670794 | 7/1989 | Switzerland | 294/86.4 |

Primary Examiner—Dean Kramer
Attorney, Agent, or Firm—Handal & Morofsky

[57] ABSTRACT

A gripping device for grasping and releasing articles by freezing and thawing water between a gripping surface and the article. The device includes a base plate, a mesh like gripping surface, a water passage to the gripping surface, a freezing element for freezing the water and bonding the gripping surface to the article and a thawing element for melting the frozen bond for releasing the article. The cooling and thawing elements use semi-circular tubing extending from the base plate and adjacent the gripping surface, through which are introduced a coolant for freezing the water and a heated liquid for thawing. Upon movement of the water via an atomizer to the gripping surface, coolant is introduced into the tubing to freeze the same. Upon freezing, the article and gripping surface become bonded. To release the article, the heated fluid is moved through the tubing so as to thaw the frozen bond.

16 Claims, 8 Drawing Sheets

Figure 11

FREEZE HOLDING DEVICE AND PROCESS

TECHNICAL FIELD

This invention is related to article handling devices, and more particularly, to a device for grasping articles for transport and releasing the same at a destination.

BACKGROUND OF THE INVENTION

In the past, a great deal of time and effort have been devoted to the development of effective ways of clutching articles of various hardness, textures, fragilities, shapes, sizes and weights, to enable the articles to be lifted by electromechanical means for relocation.

Some common tools used to clutch and lift articles include hooks, straps, clamps, and chains. These tools are usually attached to electromechanical lifts, booms, robotic arms and other similar devices. However, due to the varying shapes and sizes of the articles to be lifted, these tools cannot always be employed. Also, if an article is fragile, the stress exerted on the article by the aforementioned tools may damage the article irreparably.

Another type of device used to secure and lift articles is the electromagnet. A metal article may be secured to a device by magnetism and released therefrom upon depolarization. However, this type of device is strictly limited for use with articles having magnetic properties. Another disadvantage is that the surface of the magnetized device must come into direct contact with the article, thereby risking damage to the article from the sudden impact with the magnet.

Furthermore, mechanical and electromechanical hands, claws, jaws and the like, which are attached to robotic arms, booms and other such similar devices have also been used for the grasping and transport of articles. However, some articles are shaped and sized such that these devices cannot adequately secure the same without much time and effort. Also, some articles are of such a fragile nature that the grasping process may damage them. Moreover, electromechanical grasping devices can be bulky and cumbersome, and may require careful alignment with the articles to be secured.

Finally, U.S. Pat. No. 4,988,352 discloses a method and apparatus for implanting an intraocular lens to the eye which includes a grasping method. The lens is frozen prior to insertion into an eye so as to maintain it in a folded state during insertion. The freezing of the lens obviates the need to use a special retaining device for keeping it folded, thereby allowing a very small incision to be used. In order to insert the lens into the incision, the lens is frozen to an inserter. The minute nature of the instruments involved allow for such a process to be used. However, on a larger scale such instantaneous freezing and bonding, without the introduction of additional bonding substances, would fail to form a bond of adequate strength and size. Such a process would probably require the introduction of additional outside elements for reducing the temperature of the grasping element and creating a larger bond, as is disclosed in this invention.

The securing and lifting devices discussed above suffer from a number of problems, emanating from the article to be secured and/or lifted and the type of device used. In accordance with the present invention these and other disadvantages of the prior art are overcome.

SUMMARY OF THE INVENTION

The freeze hold device as claimed is intended to provide a remedy. It solves the problem which many electromechanical gripping devices experience, i.e., not having the ability to gently grasp a variety of sizes and shapes of articles of manufacture, having various degrees of fragility, for transport of the same.

The freeze hold device disclosed herein is adapted to grasp various sized and shaped articles with minimal contact between the device and the article. As such, damage to articles from contact with the grasping device is avoided for lack of clutching members and associated holding pressures.

In accordance with a preferred embodiment of the invention, the device includes a base plate having a plurality of looping half circular tubular conduits, constructed from a material such as copper having good heat transfer properties, extending outwardly therefrom. The conduits extend through to an opposite side of the base plate at areas adjacent the top and bottom edges of the base plate and join into one single tube which leads to a valve and onward to separate reservoirs containing a coolant and a heated liquid.

The conduits carry, at different times, the coolant and heating liquid from the reservoirs and through the looping tubular portions. If desired, a mesh-like material can extend over and in contact with the looping conduit. Upon movement into close proximity with an article to be grasped, the mesh is water soaked, for example, by water pumped through an atomizer, which extends through the base plate and sprays the water onto the mesh.

Upon substantial soaking of the mesh, the coolant is pumped through the tubular conduit, causing heat to transfer from the water soaked mesh, freezing the water between the article and the welding device and thus bonding the same. The article can be repositioned at this point, along with the ice welder, via a mechanical arm or the like. Upon reaching its destination via the mechanical arm, the article is released when the heated liquid is pumped through the looping conduit. The heat energy from the heated liquid is transferred to the frozen mesh, and the frozen bond is melted, thereby releasing the object from the device.

BRIEF DESCRIPTION OF DRAWINGS

One way of carrying out the invention is described in detail below with reference to drawings which illustrate only one specific embodiment, in which.

BEST MODE FOR CARRYING OUT THE INVENTION

Figure 1:
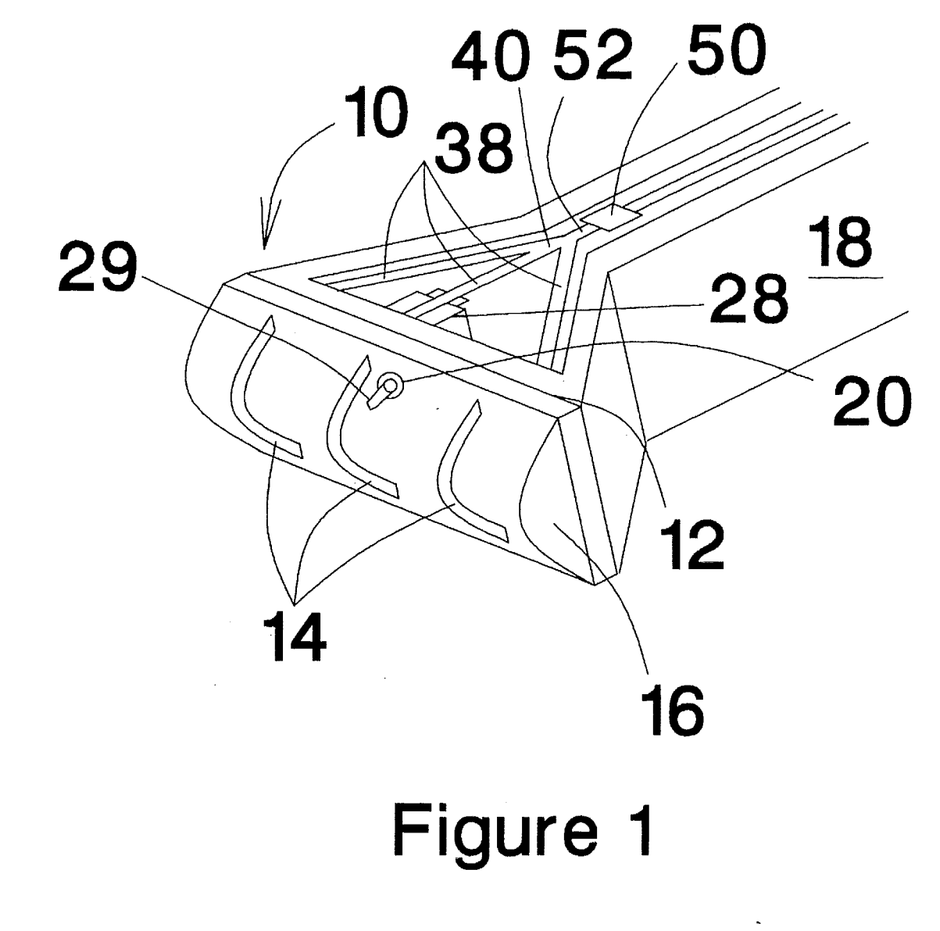
FIG. 1 is a top perspective view of a freeze hold device in accordance with the first embodiment of the present invention.
Figure 2:
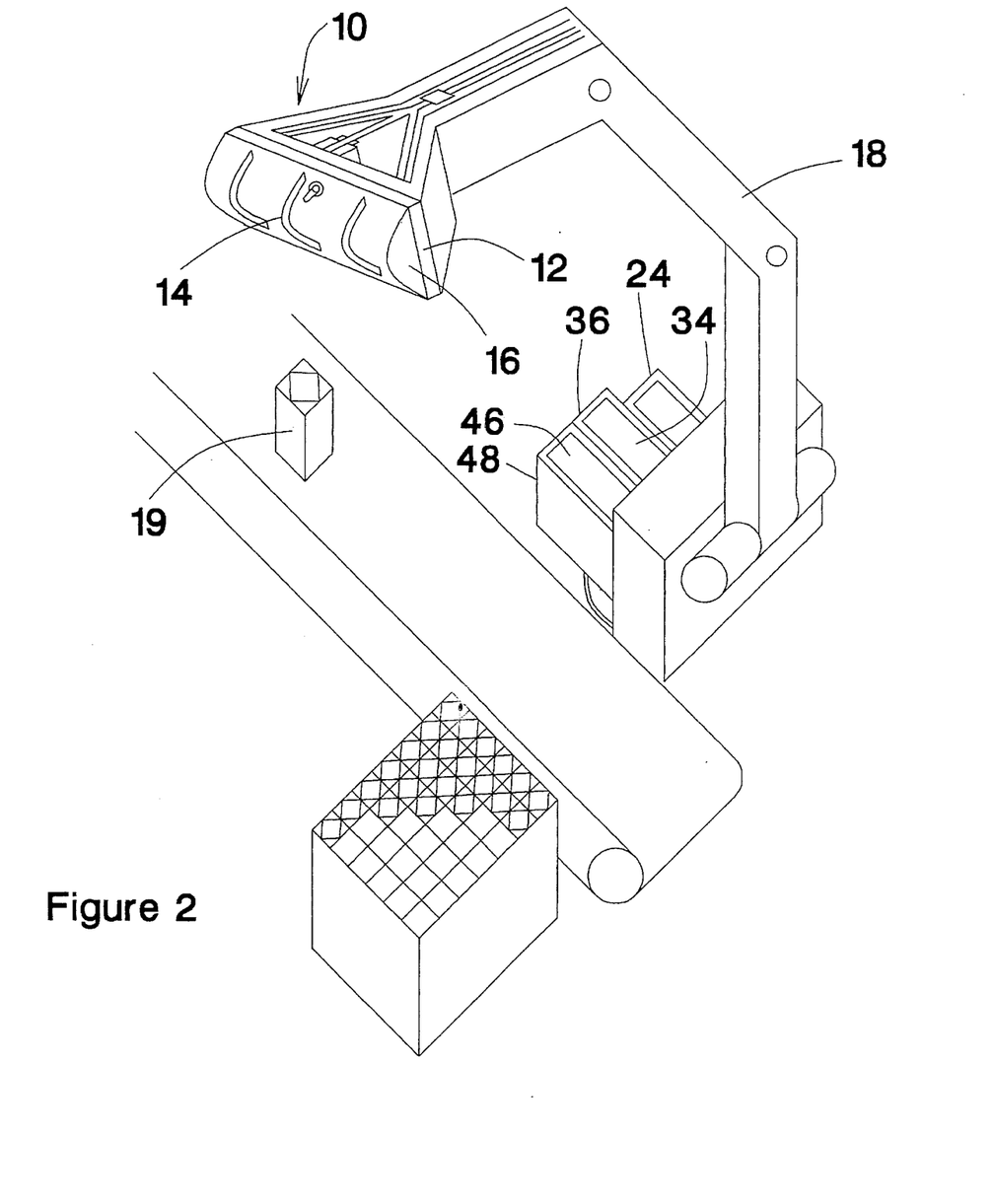
FIG. 2 is a perspective view of the device shown in FIG. 1 installed on a mechanical arm and being used for a material handling and packaging application.

Referring to the drawings wherein like reference numerals have been used throughout the various figures to designate like elements, there is shown in FIG. 1 a perspective view of the freeze hold device designated generally as 10. The freeze hold device 10 is comprised generally of the base plate 12, cooling and heating tubes 14 and a mesh covering 16. As shown in FIG. 2, the freeze hold device 10 is preferably used with a mechanical arm member 18, being connected at its free end to the freeze hold device 10, this combination facilitating the movement of the article 19.

The plate 12 is rectangular in shape, constructed from any suitable material, for example, steel, aluminum or plastic and has a corrosion prevention coating thereon and a thickness for providing sufficient stability. The plate 12 has a hole 20 through the center thereof for the introduction of a freezable liquid, preferably water, for facilitating a freeze hold gripping feature of this invention. Liquids, such as water or water based mixtures, exhibiting minimal short term corrosive effects and freezable at temperatures close to zero degrees Celsius can be used.

Figure 3:
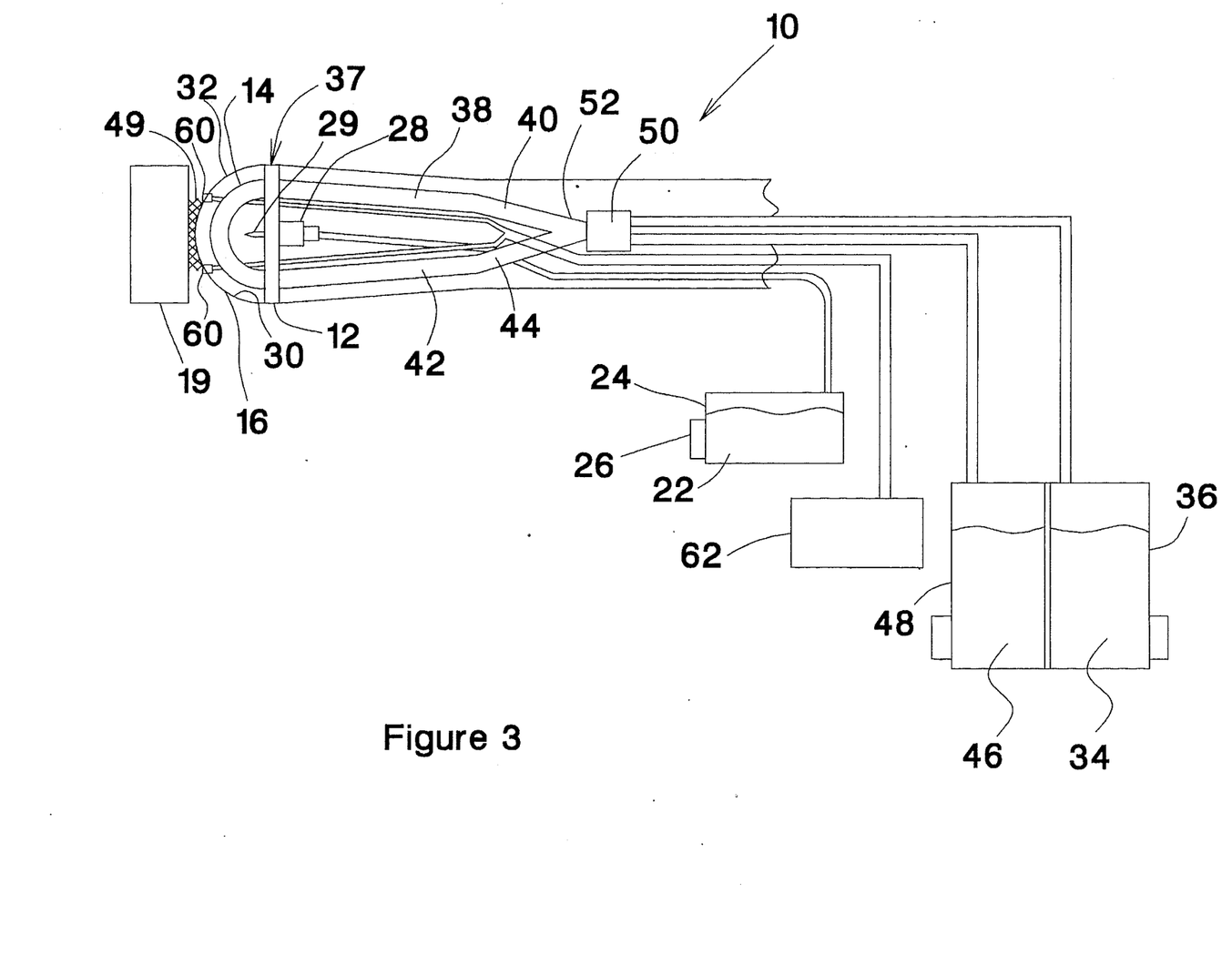
FIG. 3 is a left side elevational and cut away view of the device of FIG. 1.

Water 22 is directed from a water source 24 via a water pump 26 and through an atomizer 28 fastened to the plate 12 adjacent the hole 20 via fasteners or the like. A water atomizer has a nozzle 29 extending from the base plate toward the mesh 16, leaving an air gap between the nozzle tip and mesh 16 sufficient in size to allow for angular water spray. The water pump 26 directs the water through the atomizer 28 and nozzle 29 and onto a substantial portion of the mesh covering 16. The nozzle 29 is designed such that the water 22 exits nozzle 29 at a wide angle, preferably a minimum angle of 90 degrees so as to contact almost the entirety of the mesh covering 16.

The mesh covering 16, in the preferred embodiment, is comprised of a porous semi-flexible hydrophilic material. The mesh covering 16 is attached to the base plate 12 by solder, glue or other bonding means, depending upon the material used to construct the mesh. Water is introduced into the back side 30 of the mesh 16 which is opposite the gripping surface 32. Because of the porous and hydrophilic nature of the covering 16, the water migrates to the gripping surface 32 adjacent the article 19. Immediately after the introduction of the water to the gripping surface, the freeze hold procedure can begin so as to grip the articles to be transported.

When the water reaches the gripping surface 32, it must be instantaneously frozen so as to bond the article 19 to the gripping surface 32. Accordingly, a cooling liquid 34, such as an alcohol/water mixture, is introduced from a reservoir 36 and into the tubing 14 at a temperature well below zero degrees Celsius.

The tubing 14 is comprised of a plurality of half circle segments, preferably three, extending out of and through the base plate 12 and orientated longitudinally and parallel from the top to the bottom of the base plate 12 and equally spaced thereon. The tubes comprising this series are all identical in shape, having a 0.25" external diameter and a 0.20 internal diameter extending approximately 1.5" from the base plate at the apex of the half circles. However, alternative embodiments of the freeze hold device 10 could include four or more tubes of varying sizes and shapes, depending upon the articles being handled and space constraints.

The cooling liquid 34 is introduced into the upper end 37 of the half-circle tubing 14 via additional tubing 38 extending from each half circle section and joining into a single tube 40 which joins with a common tube which leads to the coolant reservoir 36. A refrigeration device is attached to the coolant reservoir so as to maintain the coolant at a temperature well below zero degrees Celsius. The tubing 14 should be formed from a material exhibiting high heat transfer properties, for example, copper. The low temperature coolant is moved into contact with the higher temperature water 22, gripping surface 32 and article 19, for allowing heat to transfer from these warmer areas to the coolant and create a frozen bond.

The heated liquid also uses the half circle tubes 14 and additionally, tubing 42 and 44 similar in arrangement to tubing 38 and 40 used is the cooling path but extending from the lower ends of the half circle tubing 14, and a heated liquid 46 stored in and pumped from a reservoir 48. Therefore, when it is desired to release the article from the gripping surface 32, the heated liquid 46 is introduced into the tubes 38, 40 and 14 so as to heat up the frozen bond 49. Again, as with the cooling path, it is important that the tubing is constructed from of a material, preferably copper, allowing for efficient heat transfer across the tubes to the frozen bond. Heat transfer occurs therefore, between the heated fluid and the frozen bonds 49 such that the heat from the liquid 46 is transferred to the frozen area 49 thereby melting the same. Upon melting, the article 19 is released from the gripping surface.

Because the coolant and heating liquid share the same tubing but in different directions, an electromechanical valve 50 is used to switch the tubing lines between reservoirs. Prior to reaching the valve, however, the tubing 40 and 44 merge via a coupling into a common line 52 which connects with the valve 50. Therefore, after the coolant is introduced into the tubing 38, 40 and exits the tubing 42 and 44, returning to the reservoir through the valve, for freeze welding the article, the valve is switched to the heating liquid reservoir so as to introduce the heated liquid for releasing the article.

The freeze hold device is used by first installing the freeze hold device 10 onto the mechanical arm 18 or the like. Accordingly, the ice welder 10 can be positioned to engage, for example, article 19, grip the same and to release it at a destination. The freeze hold device is best suited for robotic arm applications where the arm is required to pick up an odd shaped part in a random position.

Accordingly, the gripping surface 32 of the mesh 16 is moved into position relative to the article 19. Upon contact of the gripping surface 32 with the article 19, the water pump 26 pumps water through the atomizer and onto the gripping surface 32. Simultaneously, the coolant 34 is passed automatically through the tubes 38, 40 and 14 so as to instantaneously freeze the water 22 between and against the gripping surface 32 and article 19, creating the frozen bond 49 therebetween. That is, when heat transfer occurs, the water between the gripping surface 32 and the article 19 becomes frozen due to the loss of heat from the cooling liquid, thereby bonding the gripping surface to the article.

After freezing of the water and grasping of the article, the mechanical arm member 19 can be moved along with the freeze hold device 10 to an another position for the release of the article 19. In order to release the article from the mesh 16 and gripping surface 32, the frozen bond must be melted.

Accordingly, a heated liquid is provided for melting the frozen bond and releasing the article. Upon reaching the release position, the heated liquid is pumped through the tubes 42 and 44 and returned to the reservoir through tubes 38 and 40 and common tube 52, passing on its way through tubes 14 wherein heat transfer takes place, thereby melting the frozen bond 49. When the bond is melted, the article 19 is released and the ice welder 10 can be repositioned via the arm member 18 for gripping another article 19. The freezing and thawing processes are designed to occur instantaneously and automatically via sensors 60 and a computerized controller 62 so as to create an efficient grasping and releasing mechanism.

In accordance with the present invention, an alternative to the above embodiment may utilize a single reservoir of liquid to circulate either hot or cold liquid through tubes 14, 38, 40, 42, 44 and 52, of device 10. This can be accomplished through the use of a heating/refrigeration unit connected to the liquid supply. In this embodiment cold and hot liquid (to be used for securing and releasing articles, respectively) can be obtained without the need for either two reservoirs or a electromechanical liquid valve. Alternatively, heat generated by a cooling compressor could be transferred to the heating loop, for example, by conduction or convection to the hot liquid reservoir.

A further alternative of the above embodiment includes the Freeze Hold Device using separate reservoirs as well as separate tubing for the coolant and heated liquid. As such, the necessity of cooling the tubing or heat the same for facilitating heat transfer for bonding and release, respectively, is negated, possibly allowing for a more efficient operation.

Figures 4, 5:
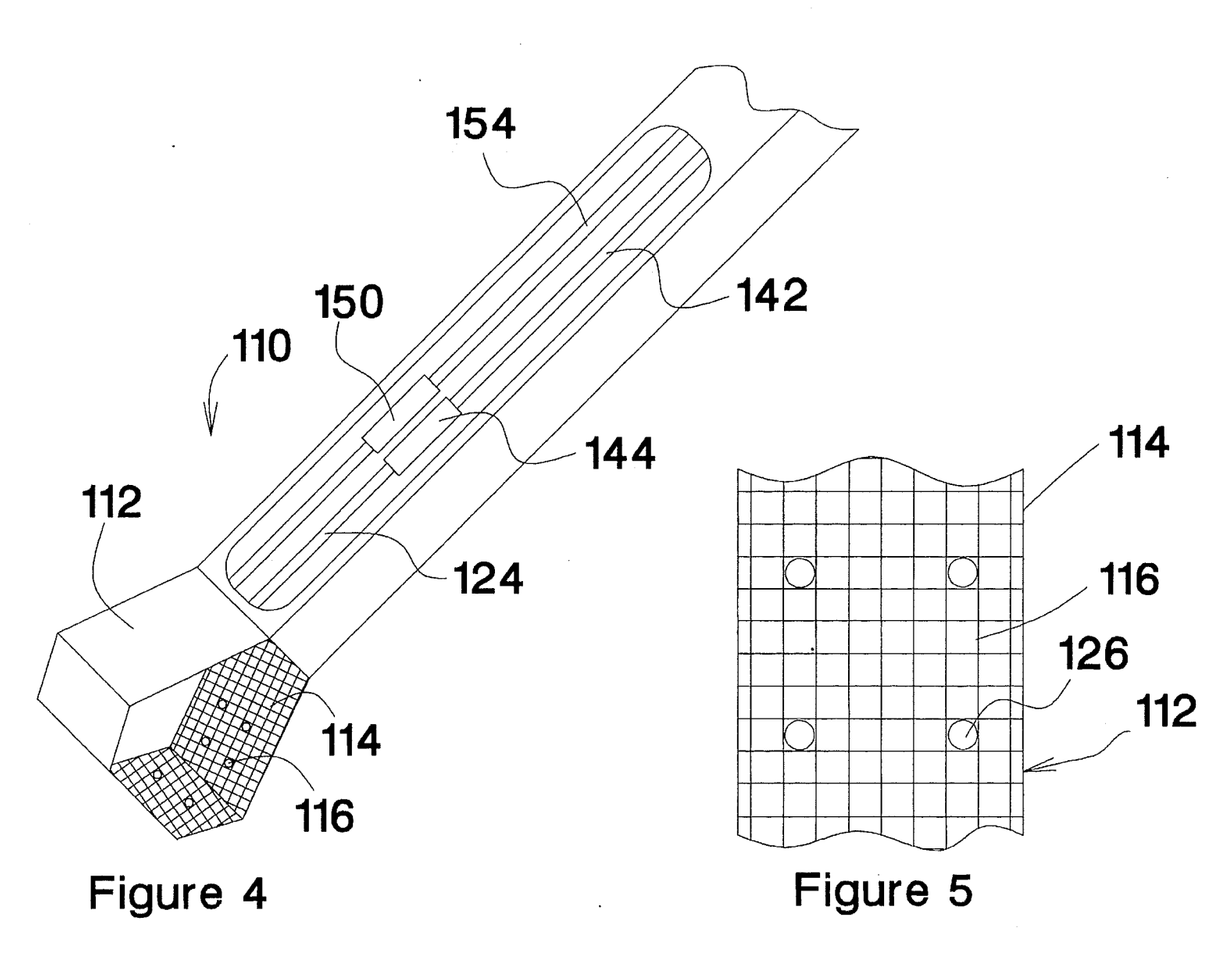
FIG. 4 is a perspective view of a second embodiment of the invention using the freeze hold process with a robotic hand.
FIG. 5 is an enlarged cut away view of the surface of the robotic hand using the freeze hold process for supplementing the hand grip.
Figure 6:
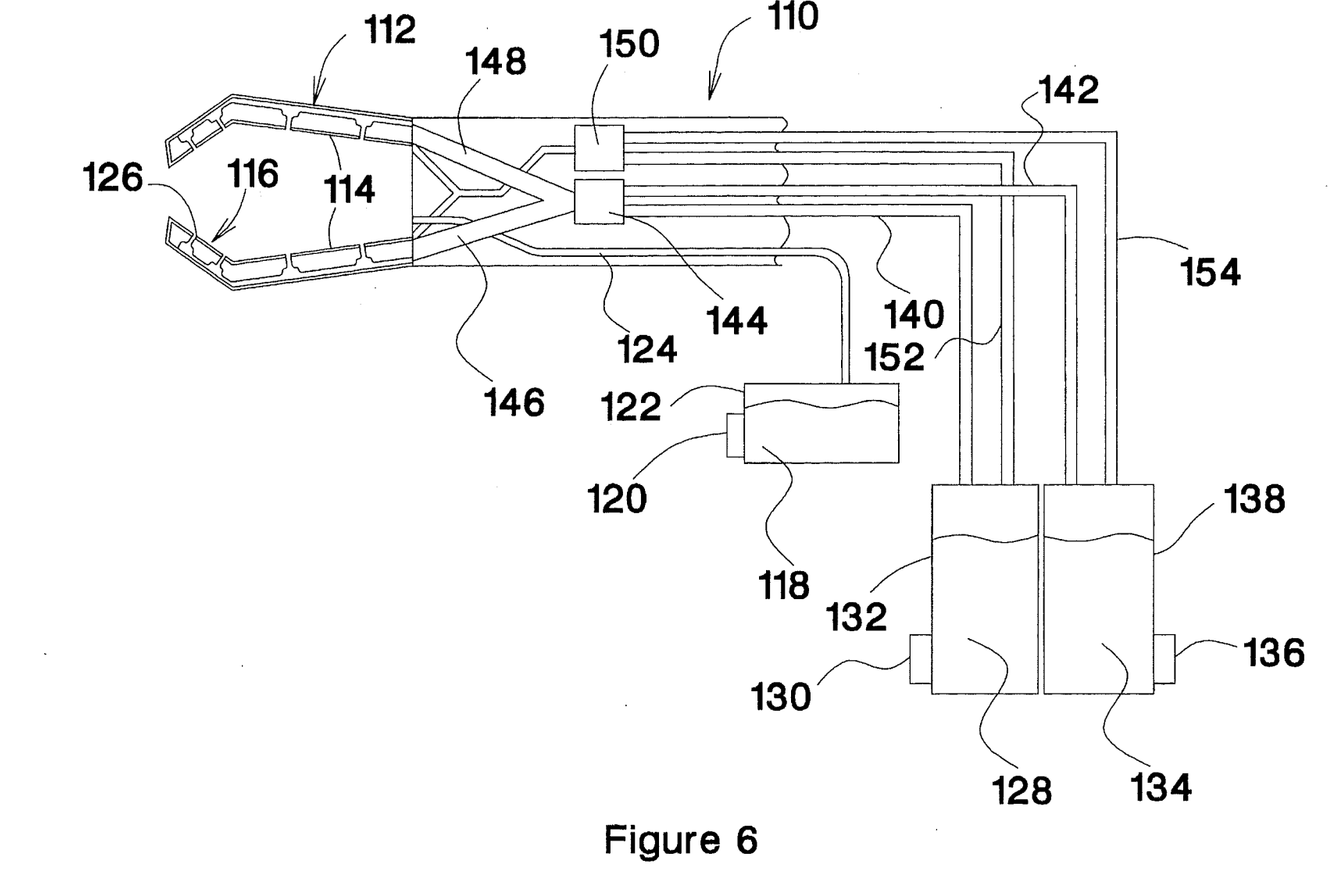
FIG. 6 is a left side elevational and cut away view of the device of FIG. 5.

A second embodiment 110, shown in FIGS. 4–6 includes using the freeze hold technology with robotic hands or probes 112. In place of the base plate 12 and mesh surface 16 of the first embodiment, a robot hand or probe 112 is used. The robot hand includes a surface 114 for gripping articles. The surface is covered with a mesh 116, shown in FIG. 5, similar to embodiment one.

Referring to FIG. 6, water 118 is introduced to the mesh surface 116 via a pump 120 from reservoir 122, to an area between an article (not shown) and the mesh surface 116 via tubing 124 and nozzles 126. A coolant 128 is introduced to the mesh surface 116 via pump 130 from reservoirs 132 to freeze the water 118 between the article and robotic hand surface 114. Upon release by the robotic hand 112, a heated liquid 134 is introduced to the mesh surface 116 via pump 136 from reservoir 138 for thawing the frozen bond created by freezing the water. Coolant 128 travels through tubing 140 from reservoir 132 and into valve 144 heated liquid 134 travels through tubing 142 from reservoir 138 and into valve 144. Before reaching robotic hand 112 and after entering valve 144, coolant 128 and heating liquid 134 each use tubing 146 and 148, at separate times, which meander under the hand surface 114. The coolant 128 and heating liquid 134 return to the reservoirs 132 and 138, respectively, through a valve 150 and respective drain tubings 152 and 154.

By introducing the water 118 to an area between the robotic gripping hand surface 114 and mesh 116 and the article via tubing 146 and 148 and nozzles 126, the gripping strength of the robotic hand can be substantially increased by the freeze hold technique. That is, the water is frozen between the article and hand surface 114 via coolant 128 forming a bond (not shown) for assisting the gripping action of the robotic hand 112.

By supplementing the robotic hand with the freeze hold process, greater gripping force by the hand 112 is obtained, without increasing squeezing forces. Accordingly, damage to articles as a result of increasing the gripping forces associated with robotic hand 112, is averted by this supplementation. The thawing liquid 134 is then introduced through the path described for facilitating release, similar to the first embodiment 10.

Figure 7:
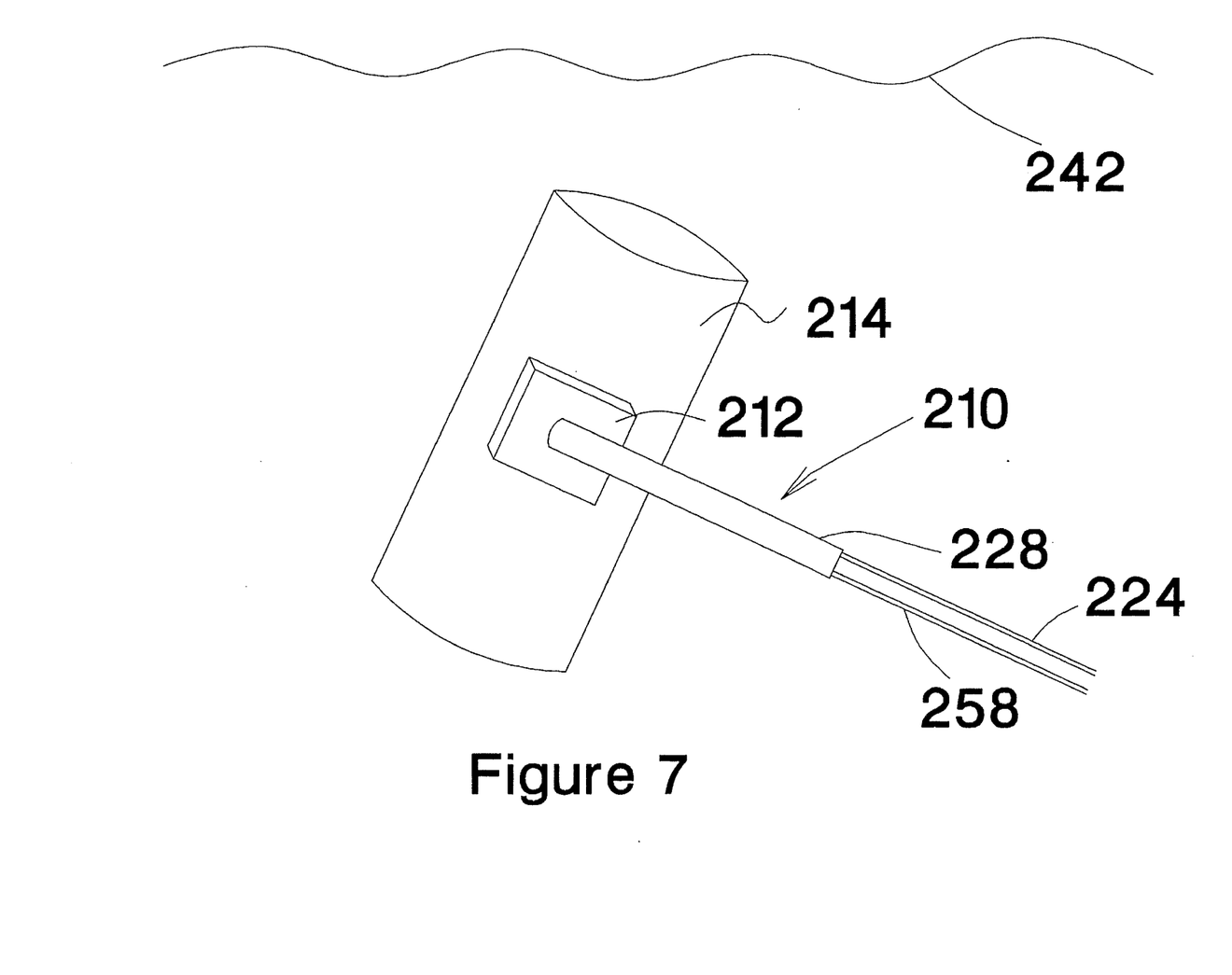
FIG. 7 is a perspective view of a third embodiment of the invention using the freeze hold process for underwater applications.
Figure 8:
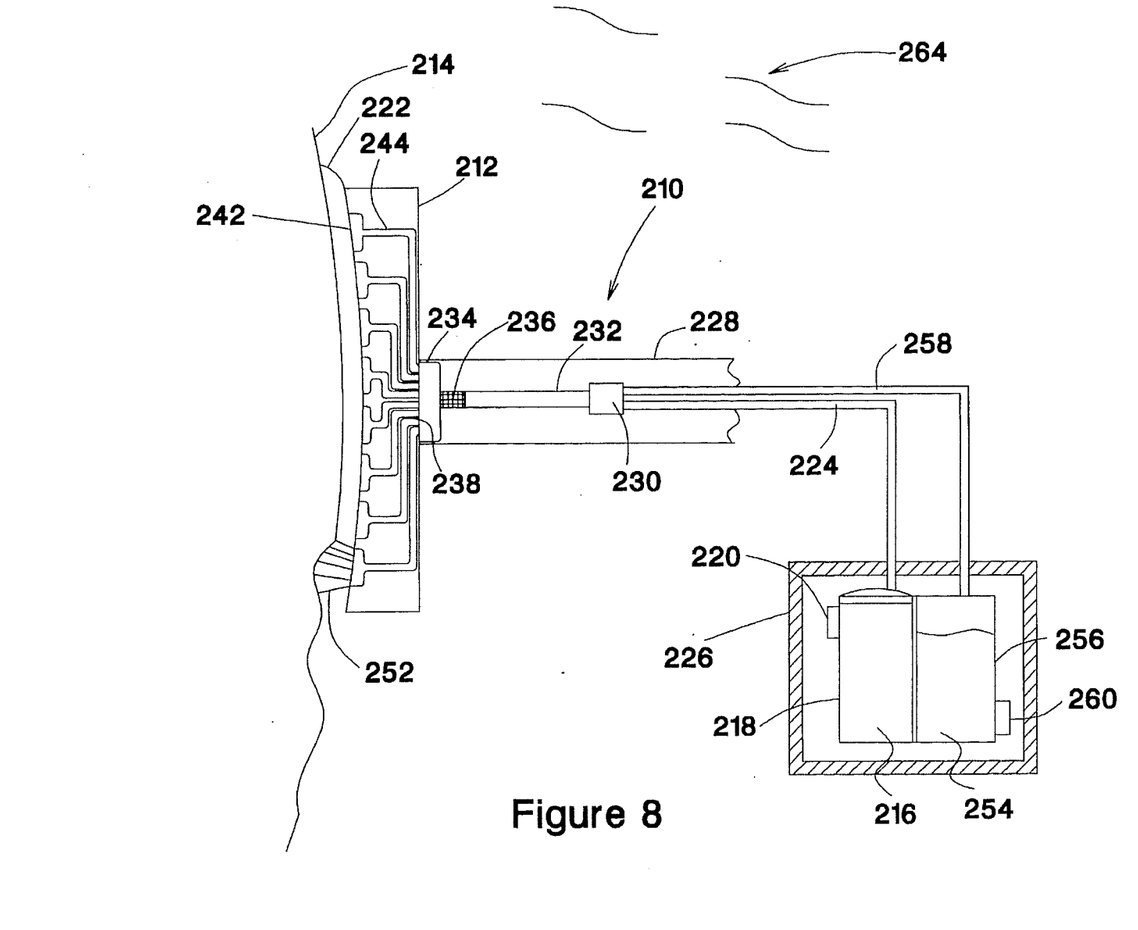
FIG. 8 is a left side elevational and cut away view of the device of FIG. 7.
Figure 9:
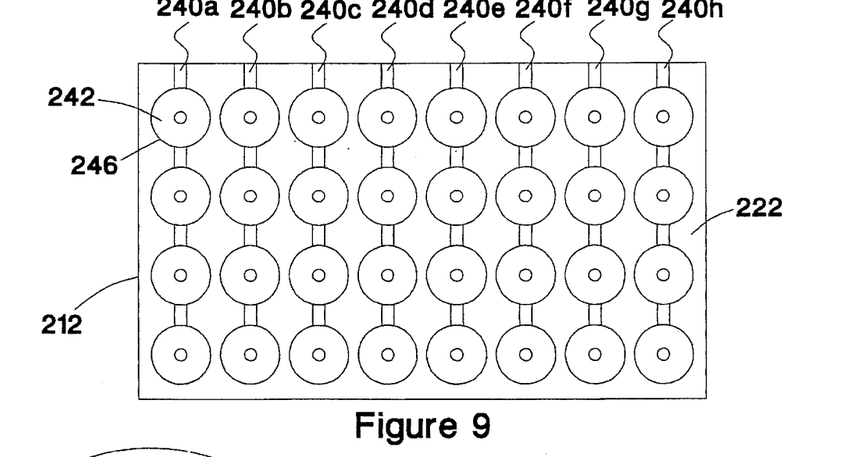
FIG. 9 is a front elevational view of a gripping head of the third embodiment.

A third embodiment 210, shown in FIGS. 7–9, incorporates the freeze hold technology and is used for the securing and/or moving of articles or machinery underwater. Applications includes salvage, the manipulation and movement of undersea storage tanks and the manipulation and moving of mining and oil rigs.

Referring to FIG. 8, the third embodiment 210 includes a substantially water tight rectangularly shaped gripping head 212 having a gripping surface 214 which is shaped to conform to an article 214, such as, a barrel of hazardous waste.

Referring to FIG. 8, an extremely low temperature coolant 216, such as liquid nitrogen or carbon dioxide is released from a pressurized storage cylinder 218, preferably cooled and insulated, via a control valve 220 to a gripping surface 222 of the head 212 through heavily insulated tubing 224. The tubing 224 is attached to the pressurized storage cylinder 218, which is comprised of a compressor, a heat exchanger and a throttling valve, enclosed in a water tight housing 226. The tubing extends through a water tight insulated tubular housing 228 and into valve 230. From valve 230, a second tubing 232 extends into a dispersement connector 234, adjacent the head 212.

The connector comprises an input port 236 leading to eight exit ports 238 for connecting to delivery tubes 240a–h attached to the interior of head 212. The delivery tubes 240a–h extend under the gripping surface 222, as shown in FIG. 9, and are each attached in four locations to nozzles which extend outwardly to the gripping surface 222 from within the head 212.

The nozzles are all substantially the same and connected to the delivery tubes 240a–h in the same manner. Accordingly, only one nozzle will be described in detail and referred to by number, it being understood the description applies equally to all of the nozzles.

As shown in FIG. 9, the nozzles are positioned in horizontal and vertical rows under the entire gripping surface 222. The nozzle 242 is substantially conical in shape being connected at a small end 244 to the delivery tube 240a. The large, circularly shaped end 246 of the conical shape extends to the gripping surface 222. The nozzle are designed to deliver the coolant in a fine spray to the water.

Figure 10:
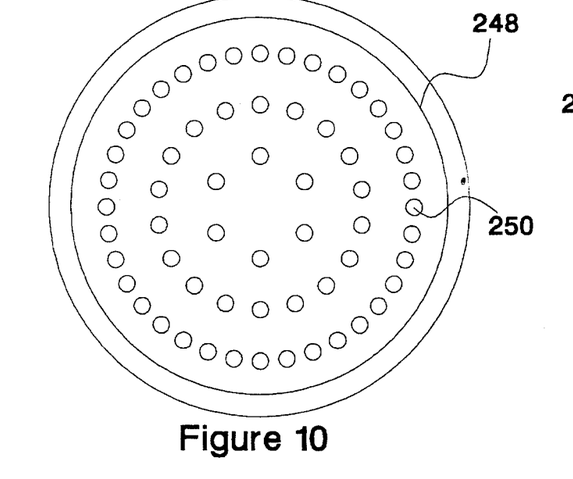
FIG. 10 is a front view of a nozzle of the third embodiment.

The nozzle 242 includes a circularly shaped perforated screen 248 therein, spaced back from end 246, causing the coolant to be uniformly dispersed over an area of the gripping head surface 222 assigned to the particular nozzle. The perforations 250 cover the entire area of the circular screen 248 and are machined in the screen 248 so that the perforations 250 are directed angularly outward from the center of the circular screen 248. As a result, a conical spray zone 252 causing a disc shaped contact end is created for freezing the water.

Because of the potentially low pressure at the wide end of the divergent nozzle 242 and extremely cold gas passing through the same end of the converging nozzle 242, water may tend to freeze the opening, thus blocking passage. Therefore, as an alternative to the diverging nozzles shown in FIGS. 8–10, particularly nozzle 242, a convergent nozzle 251 is disclosed in FIG. 11.

Figure 11:
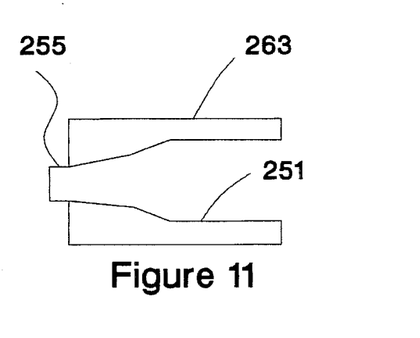
FIG. 11 is a side view of an alternative nozzle for us with the third embodiment.

The converging nozzle is also connected to the delivery tubes 240a but at its wide end. The nozzle may rest in a cylindrically shaped housing 253 having a mechanized system (not shown) for retracting the nozzles from contact with the water 264 and a port 255 allowing movement of the nozzles to the water. During retraction, a seal (not shown) covers the port 255 to stop water from entering the housing through the port and during use a seal prevents water from entering the area between the housing 253 and nozzle 251.

Accordingly, a significant amount of water is prevented from entering the housing and port. The combination of higher pressure at the exit end of the diverging nozzle 251 and the seals and retraction mechanism allow the divergent nozzles to operate without ice blockage. However, because of the divergent nature of the same, either more nozzles over the surface area should be used or a screen similar to screen 248 should be used for uniformly directing the coolant and thawing fluids. The seals and retraction mechanism may also be incorporated in the convergent nozzle design so as to prevent freezing therein and blockage.

A thawing liquid 254 is supplied from a reservoir 256 through a tube 258 via a pump 260 to the valve 230 and delivery tubes 240a–h. The thawing fluid is typically a high temperature liquid which is heated in the reservoir 256 via a heating element (not shown). The reservoir and pumps are enclosed in the water tight and submergible containment system or housing 226 along with the pressurized storage cylinder 218 and a power supply (not shown) for energizing the pumps and the heating element.

In this case, the salt water or fresh water 264 can be used as the freezable substance for bonding the article 214 or machinery to the gripping surface 222 of the gripping head 212. Accordingly, the head is moved adjacent the article for the grasping of the same, as shown in FIG. 7 and 8. The head may also include a magnet therein for assisting the positioning of the head on the article being moved. The pump 220 directs the coolant via tubing 224 and delivery tubing 240a–h and nozzles to surface 222 and the salt water 264 between the article or machinery and head.

The liquid coolant 216 freezes the salt or fresh water 264 between and to the head and article or machinery. The nozzles release the coolant 216 in a narrow streams to form small bubbles and avoid the formation of large bubbles which would disable the bonding process. The number of nozzles and the area of coolant dispersement causes the coolant to contact an area of water 264 substantially equal to the size of the gripping surface 222 thereby causing a frozen bond substantially the same size to form.

Because of the large temperature difference between the liquid gas coolant and the water, the liquified gas coolant 216 returns to its gas state and small bubbles become trapped in the ice. These bubbles, however, do not disable the bonding process. With the creation of the frozen bond, the machinery or article 214 can then be transported, as shown in FIG. 8, to and alternate location via a mechanized arm or a manually grasped extension. As with the main embodiment, when release is desired, the thawing fluid 254 is introduced to the gripping surface 222. The thawing fluid is introduced to the surface 222 via through tubing 258, delivery tubes 240a–h and the nozzles so as to melt the bond created and thereby complete the freeze hold process.

A fourth embodiment includes using the freeze hold process for consolidating and securing cargo containers for shipment by air and sea, i.e., for supplementing existing ties and restraints as necessary during storms or otherwise rough traveling, in airplane and ship cargo holds. In accordance with the freeze hold process, a quickly freezable liquid such as water can be introduced between the container and the ship or airplane support surface. The liquid can then be instantly frozen via application of a freezing element such as a cold air blower, thereby creating a frozen bond between the container and surface. As a result, the cargo container is maintained securely and immobile on the support surface. To release the frozen bond, a hot air blower can be used to apply hot air for melting the same.

For example, the cold air and hot air blowers are installed in a recessed floor area over which the cargo is to be placed. The recessed floor area is comprised of a water absorbent and air pervious sponge like material. Water is introduced into the recessed area and sponge like material between the container and floor. The water fills the area and soaks the sponge and bottom of the container, failing to drain because of the recess. The cold air blowers are then activated, freezing the water to and between the sponge like material and container, creating a frozen bond. To release the containers, the hot air blowers are activated and the frozen bond thawed. Additionally, interfitting cargo such as packages can be arranged in a stacked manner and secured as a singular bundle using a similar process.

Additional embodiments of the freeze hold device and the freezing and thawing portions thereof could include using mechanized temperature controlled cold plates, positioned in a gripping head, for contact and bonding with articles, having heating elements therein for facilitating release. Such a device may be applicable to articles which are, for example, already frozen. Also, alcohol are other similar ice melting substance can be used for accomplishing release instead of passing a heated liquid through the tubing. Air jets for directing extremely hot air can be used as well for melting the frozen bond. This invention may also be used with articles that are already wet such that existing moisture can be frozen, thereby requiring no additional water. Finally, the gripping head can be formed from ice for bonding directly to the articles and thereby negating the need for a coolant to lower the temperature of the gripping surface of the head. The head can be designed so that the ice can be replaced and release can be accomplished by the application of heat in any form.

While an illustrative embodiment of the freeze hold device has been described above, it is, of course, understood that various modifications will be apparent to those of ordinary skill in the art. Such modifications are within the spirit and scope of the invention, which is limited and defined only by the appended claims.

I claim:

1. A freeze hold device for gripping and releasing an article, comprising:

(a) a base movable toward said article and carrying a gripping surface configured and dimensioned to engage said article;

(b) a freezable liquid movable into contact with said gripping surface and said article;

(c) a selectively actuable freezing means and a selectively actuable thawing means comprised of tubing located adjacent said base and adjacent said gripping surface, said tubing adapted to receive a coolant for freezing a freezable liquid and forming a frozen bond between said article and said gripping surface, said tubing adapted to receive a heated liquid for melting said bond and releasing said article from said gripping surface.

2. A freeze hold device as in claim 1 wherein said gripping surface comprises a robotic hand.

3. A freeze hold device as in claim 1 wherein said thawing means uses an ice melting substance that directly contacts said frozen bond and melts the same.

4. A freeze hold device as in claim 1, wherein said gripping surface is comprised of a hydrophilic material which covers said tubing.

5. A freeze hold device as in claim 1, wherein said tubing is comprised of a series of tubular conduits extending from said base, said conduit constructed from a material exhibiting efficient heat conductivity properties.

6. A freeze hold device as in claim 1, wherein said coolant and said heated liquid originate in separate reservoirs, said reservoirs being connected through a common valve to the same line of said tubing for liquid supply thereto.

7. A freeze hold device as in claim 1, wherein said coolant and said heated liquid originate in separate reservoirs, said reservoirs being connected through a valve to separate lines of said tubing for liquid supply thereto.

8. A freeze hold device as in claim 1 further comprising a mechanical arm having said gripping surface attached to an end thereof.

9. A freeze hold device as in claim 1, further comprising an opening through said base, said freezable liquid being adapted to enter said opening for access to said gripping surface.

10. A freeze hold device as in claim 1, further comprising an opening through said base, said freezable liquid being adapted to enter said opening for access to said gripping surface, wherein said opening has an atomizer therein through which said freezable liquid passes.

11. A freeze hold device as in claim 1, wherein said freezing and thawing means are activated by a computerized controller, said controller causing the appropriate liquid to enter said tubing for facilitating grasping and releasing.

12. A freeze hold device for gripping and releasing an article, comprising:
    (a) a base movable toward said article and carrying a gripping surface configured and dimensioned to engage said article;
    (b) a selectively actuable cold liquid and a selectively actuable hot liquid, said liquids being supplied from separate reservoirs via a common valve;
    (c) a freezable liquid movable into contact with said gripping surface; and
    (d) a passage comprised of heat conductive material for allowing said cold liquid to freeze said freezable liquid between and to said gripping surface and said article for creating a frozen bond therebetween, said passage allows said hot liquid to separate said gripping surface and said article by melting said frozen bond.

13. A freeze hold device as in claim 12, wherein said freezing and thawing means are activated by a computerized controller, said controller causing the appropriate liquid to enter said passage for facilitating grasping and releasing.

14. A freeze hold device as in claim 12 further comprising a mechanical arm having said gripping surface attached to an end thereof.

15. A freeze hold device as in claim 12, further comprising an opening through said base, said freezable liquid being adapted to enter said opening for access to said gripping surface.

16. A freeze hold device as in claim 12, further comprising an opening through said base, said freezable liquid being adapted to enter said opening for access to said gripping surface, wherein said opening has an atomizer therein through which said freezable liquid passes.

\* \* \* \* \*